United States Patent
Namekawa

(10) Patent No.: US 7,928,796 B2
(45) Date of Patent: Apr. 19, 2011

(54) CONSTANT VOLTAGE BOOST POWER SUPPLY

(75) Inventor: Toshimasa Namekawa, Ota-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/487,941

(22) Filed: Jun. 19, 2009

(65) Prior Publication Data

US 2009/0315598 A1 Dec. 24, 2009

(30) Foreign Application Priority Data

Jun. 23, 2008 (JP) ................. 2008-163598

(51) Int. Cl.
*G05F 1/575* (2006.01)
*G05F 1/62* (2006.01)
*H02M 3/04* (2006.01)

(52) U.S. Cl. ........... 327/537; 327/114; 327/535; 363/60

(58) Field of Classification Search .................... None
See application file for complete search history.

(56) References Cited

U.S. PATENT DOCUMENTS

| | | | | |
|---|---|---|---|---|
| 6,356,062 B1 * | 3/2002 | Elmhurst et al. | ............. | 323/282 |
| 6,359,947 B1 * | 3/2002 | Rao | ............... | 375/374 |
| 6,791,212 B2 * | 9/2004 | Pulvirenti et al. | ........... | 307/113 |
| 7,106,649 B2 | 9/2006 | Wada et al. | | |
| 7,253,676 B2 * | 8/2007 | Fukuda et al. | ................ | 327/536 |
| 7,256,641 B2 | 8/2007 | Namekawa et al. | | |
| 7,532,062 B2 | 5/2009 | Namekawa et al. | | |
| 7,639,067 B1 * | 12/2009 | Perisetty | ....................... | 327/537 |
| 2007/0181918 A1 | 8/2007 | Wada et al. | | |

OTHER PUBLICATIONS

U.S. Appl. No. 11/670,605, filed Feb. 2, 2007, Osamu Wada, et al.
Tomohiro Matsukawa, et al., "High-Efficiency Charge Pump Circuits", The 17th Workshop on Circuits and Systems in Karuizawa, Apr. 26, 27, 2004, 14 Pages (with English Translation).

* cited by examiner

*Primary Examiner* — Lincoln Donovan
*Assistant Examiner* — Terry L Englund
(74) *Attorney, Agent, or Firm* — Oblon, Spivak, McClelland, Maier & Neustadt, L.L.P.

(57) ABSTRACT

A constant voltage boost power supply according to an aspect of the invention includes a voltage-controlled variable frequency oscillator that produces and supplies a clock signal and changes an oscillating frequency of the supplied clock signal according to an input control voltage; a charge pump into which the clock signal is fed, the charge pump performing a pumping operation in synchronization with the clock signal to boost an input voltage and supply an output voltage in which the input voltage is boosted; a voltage dividing circuit that divides the output voltage of the charge pump to supply a monitor voltage; and a differential amplifier into which the monitor voltage and a reference voltage are fed, the differential amplifier amplifying a potential difference between the monitor voltage and the reference voltage to supply the control voltage.

7 Claims, 14 Drawing Sheets

CONSTANT VOLTAGE BOOST POWER SUPPLY

CROSS-REFERENCE TO RELATED APPLICATIONS

This application is based upon and claims the benefit of priority from the prior Japanese Patent Application No. 2008-163598, filed on Jun. 23, 2008, the entire contents of which are incorporated herein by reference.

BACKGROUND OF THE INVENTION

1. Field of the Invention

The present invention relates to a constant voltage boost power supply, and particularly to a constant voltage boost power supply that is suitable to an internal power supply incorporated in a semiconductor integrated device.

2. Description of the Related Art

The constant voltage boost power supply that produces an output voltage higher than a supply voltage given from the outside is essential in various semiconductor memory devices such as a dynamic memory (DRAM) in which a rewrite operation is required, a nonvolatile memory (EEPROM) in which information is stored by accumulating a charge in a floating gate, a fuse memory in which information is stored by fusing a fuse link, and an anti-fuse memory in which information is stored by breaking a gate insulator. For example, a consumption current reducing technique has been proposed in order to reduce a leak current of a MOS transistor constituting a semiconductor memory device during cutoff. That is, a bulk terminal of the MOS transistor is set to a negative voltage, or the bulk terminal is set to a voltage higher than the supply voltage. Therefore, the constant voltage boost power supply becomes a main component in the highly integrated semiconductor logic circuit.

Generally, good power efficiency, elimination of an external component such as a coil, and mounting in a small chip area are required in the constant voltage boost power supply used in the semiconductor memory devices.

Frequently a Dickson charge pump is used as the constant voltage boost power supply. The Dickson charge pump is an electronic circuit, in which an output voltage higher than a supply voltage or a negative voltage is produced while charge and discharge are repeated between plural capacitors (hereinafter referred to as "pumping capacitor") connected with rectifying element interposed therebetween.

In the Dickson charge pump, the charge and discharge of the pumping capacitor are repeated to perform a boost operation in synchronization with an externally supplied clock signal or a clock signal that is produced by a ring oscillator or a multivibrator. An on-off control system is adopted in order to keep the obtained output voltage constant. In the on-off control system, a resistance voltage dividing circuit divides the output voltage, the obtained monitor voltage and a reference voltage are compared to each other, the charge pump is operated when the monitor voltage is lower than the reference voltage, and the charge pump is stopped when the monitor voltage is higher than the reference voltage.

A boost power supply based on a current measurement clock frequency control system is proposed as another conventional technique (see "Study of High-Performance Charge Pump Power Supply Circuit", Tomohiro Matsukawa et al., 17th Karuizawa Workshop for Circuit and System, Apr. 26, 2004). In this boost power supply, advantageously a frequency of the clock signal is automatically adjusted such that efficiency is maximized for a load current. A differential amplifier detects and amplifies a voltage drop caused by a current passed through a current-detecting resistance connected in series to an output, the differential amplifier supplies a control voltage, a voltage-controlled oscillator into which the control voltage is fed supplies a clock signal having a higher frequency when the control voltage is high, and the voltage-controlled oscillator supplies the clock signal having the lower frequency when the control voltage is low, thereby realizing the automatic adjustment of the clock signal frequency.

The output voltage in the current measurement clock frequency control system depends on a supply voltage supplied to the charge pump and an electrical characteristic of a MOS transistor constituting the charge pump. The constant voltage boost power supply cannot be configured by the operation, in which a consumption current of the charge pump is increased in the large load current while the consumption current of the charge pump is reduced in the small load current. Generally a constant voltage boost power supply, in which the voltage is kept constant irrespective of the supply voltage or the electrical characteristic of the element, is demanded as the internal boost power supply for the semiconductor memory device. From this standpoint, the charge pump in which the conventional clock frequency control is performed cannot be used as the internal boost power supply.

SUMMARY OF THE INVENTION

In accordance with a first aspect of the invention, a constant voltage boost power supply includes a voltage-controlled variable frequency oscillator that produces and supplies a clock signal and changes an oscillating frequency of the supplied clock signal according to an input control voltage; a charge pump into which the clock signal is fed, the charge pump performing a pumping operation in synchronization with the clock signal to boost an input voltage and supply an output voltage in which the input voltage is boosted; a voltage dividing circuit that divides the output voltage of the charge pump to supply a monitor voltage; and a differential amplifier into which the monitor voltage and a reference voltage are fed, the differential amplifier amplifying a potential difference between the monitor voltage and the reference voltage to supply the control voltage.

In accordance with a second aspect of the invention, a constant voltage boost power supply includes a voltage-controlled variable frequency oscillator that produces and supplies a clock signal and changes an oscillating frequency of the supplied clock signal according to an input control voltage; a charge pump into which the clock signal is fed, the charge pump performing a pumping operation in synchronization with the clock signal to boost an input voltage and supply an output voltage in which the input voltage is boosted; a voltage dividing circuit that divides the output voltage of the charge pump to supply a monitor voltage; and a closed-loop differential amplifier into which the monitor voltage and a reference voltage are fed, the differential amplifier amplifying a potential difference between the monitor voltage and the reference voltage to supply the control voltage.

In accordance with a third aspect of the invention, a constant voltage boost power supply includes a voltage-controlled variable frequency oscillator that produces and supplies a clock signal and changes an oscillating frequency of the supplied clock signal according to an input control voltage; a charge pump into which the clock signal is fed, the charge pump performing a pumping operation in synchronization with the clock signal to boost an input voltage and supply an output voltage in which the input voltage is boosted; a voltage dividing circuit that divides the output voltage of the charge pump to supply a monitor voltage; and a differential amplifier that is driven with a voltage higher than the input voltage as a power source, the monitor voltage and a reference voltage being fed into the differential amplifier, the differential amplifier amplifying a potential difference between the monitor voltage and the reference voltage to supply the control voltage.

DETAILED DESCRIPTION OF THE EMBODIMENTS

A semiconductor boost power supply according to an embodiment of the invention will be described in detail with reference to the drawings.

First Embodiment

On-Off Control Constant Voltage Boost Power Supply

First, a constant voltage boost power supply that realizes a stable boost operation by on-off control will be described.

Figure 1:
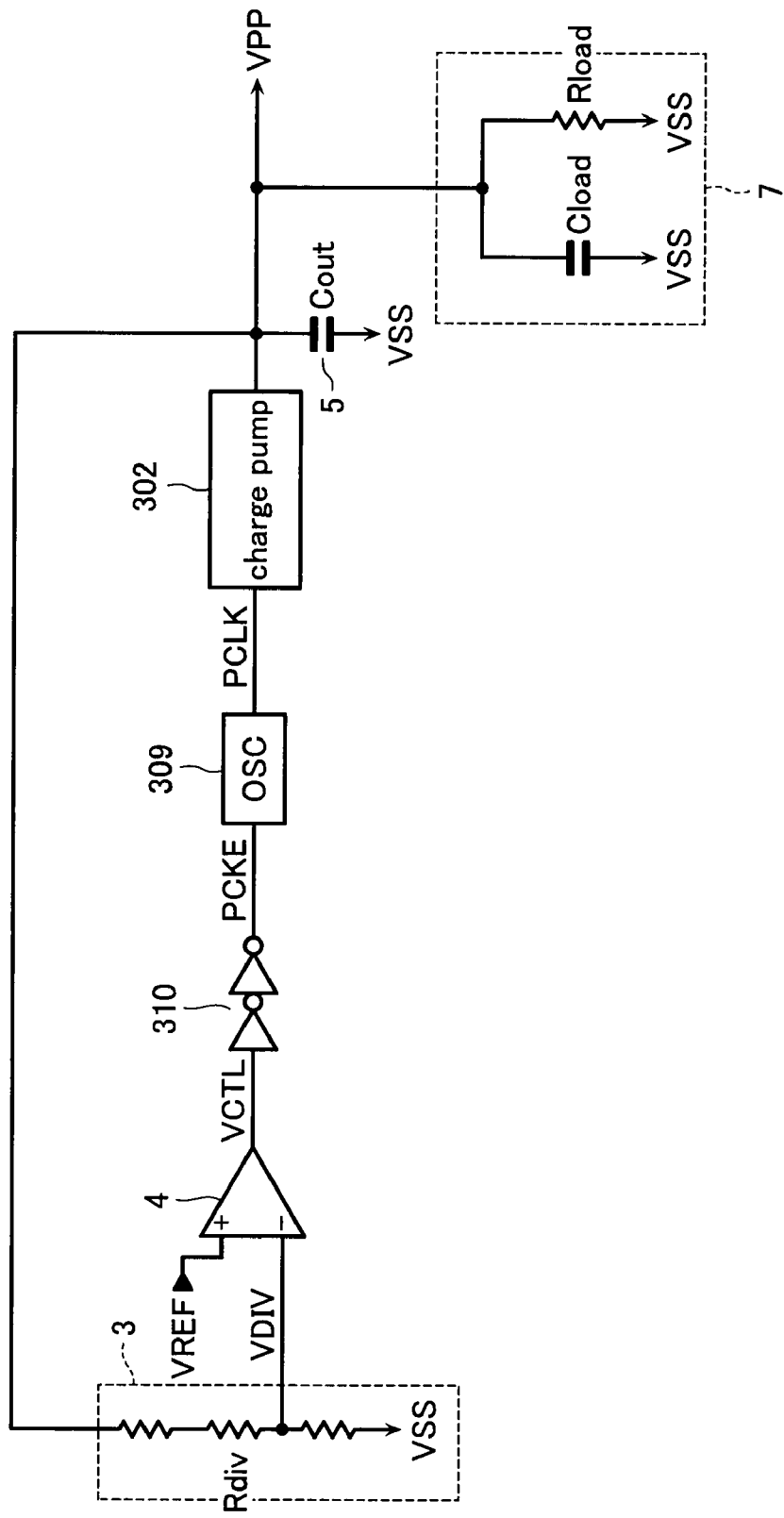
FIG. 1 is a block diagram illustrating an on-off control constant voltage boost power supply.

FIG. 1 is a block diagram illustrating an on-off control constant voltage boost power supply.

The on-off control constant voltage boost power supply includes an on-off control oscillator (OSC) 309 and a charge pump 302. The oscillator 309 steadily oscillates a clock signal PCLK when an oscillation enable signal PCKE is activated. The charge pump 302 receives the clock signal PCLK, and performs a pumping operation in synchronization with the clock signal PCLK. The on-off control constant voltage boost power supply also includes a voltage dividing circuit 3 and a differential amplifier 4. The voltage dividing circuit 3 divides an output voltage VPP of the charge pump 302 with a resistance. In the differential amplifier 4, an inverting input "−" and a noninverting input "+" receive a monitor voltage VDIV that is an output of the voltage dividing circuit 3 and a reference voltage VREF supplied from the outside. The differential amplifier 4 amplifies a potential difference between the inputs to supply a control voltage VCTL.

Figure 2:
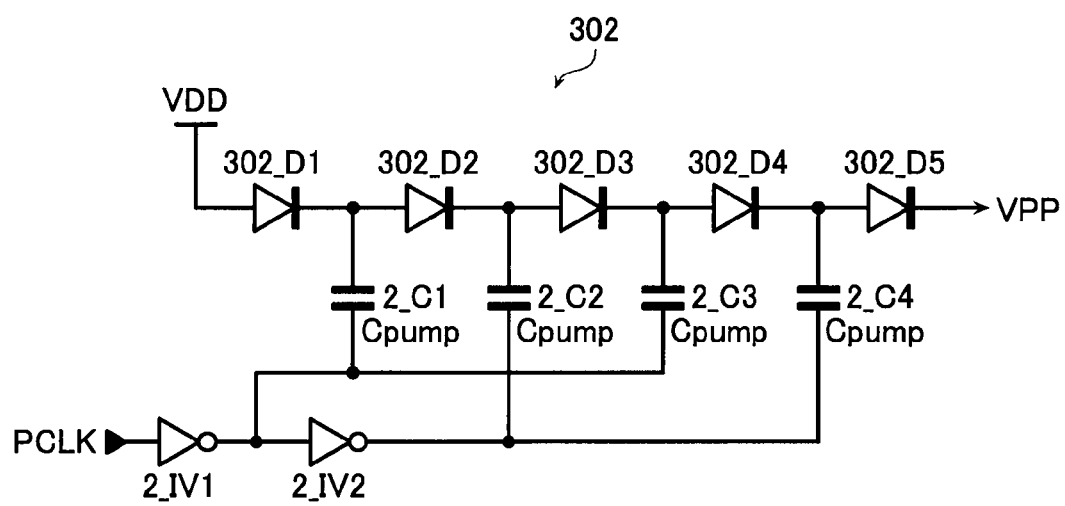
FIG. 2 is a circuit diagram illustrating a charge pump of the constant voltage boost power supply.

FIG. 2 is a circuit diagram illustrating the charge pump 302.

The charge pump 302 is formed such that five diodes 302_D1 to 302_D5, in which a drain and a gate are connected, are connected in series. An anode of the first-stage diode 302_D1 is connected to a power supply line that is at a level of a supply voltage VDD. An anode of a diode 302_Di (i is an integer of 1 to 4) and a cathode of a diode 302_Di+1 are connected to each other. One end of each of pumping capacitors 2_C1 to 2_C4 is connected to the cathode of each of the diodes 302_D1 to 302_D4. Each of the pumping capacitors 2_C1 to 2_C4 has a capacitance Cpump. The clock signal PCLK supplied from the outside is supplied to the other end of each of the capacitors 2_C1 and 2_C3 through an inverter 2_IV1, and is supplied to the other end of each of the capacitors 2_C2 and 2_C4 through inverters 2_IV1 and 2_IV2. The charge pump 302 is a four-stage Dickson charge pump, and the output voltage VPP is supplied from the cathode of the diode 302_D5.

In the on-off control constant voltage boost power supply, the resistance voltage dividing circuit 3 divides the output voltage VPP to obtain a detection voltage VDIV, and the detection voltage VDIV and a predetermined reference voltage VREF are compared to each other. The charge pump 302 is operated when the detection voltage VDIV is lower than the predetermined reference voltage VREF, and the charge pump 302 is stopped to keep the boosted output voltage VPP constant when the detection voltage VDIV is higher than the predetermined reference voltage VREF.

Figure 3:
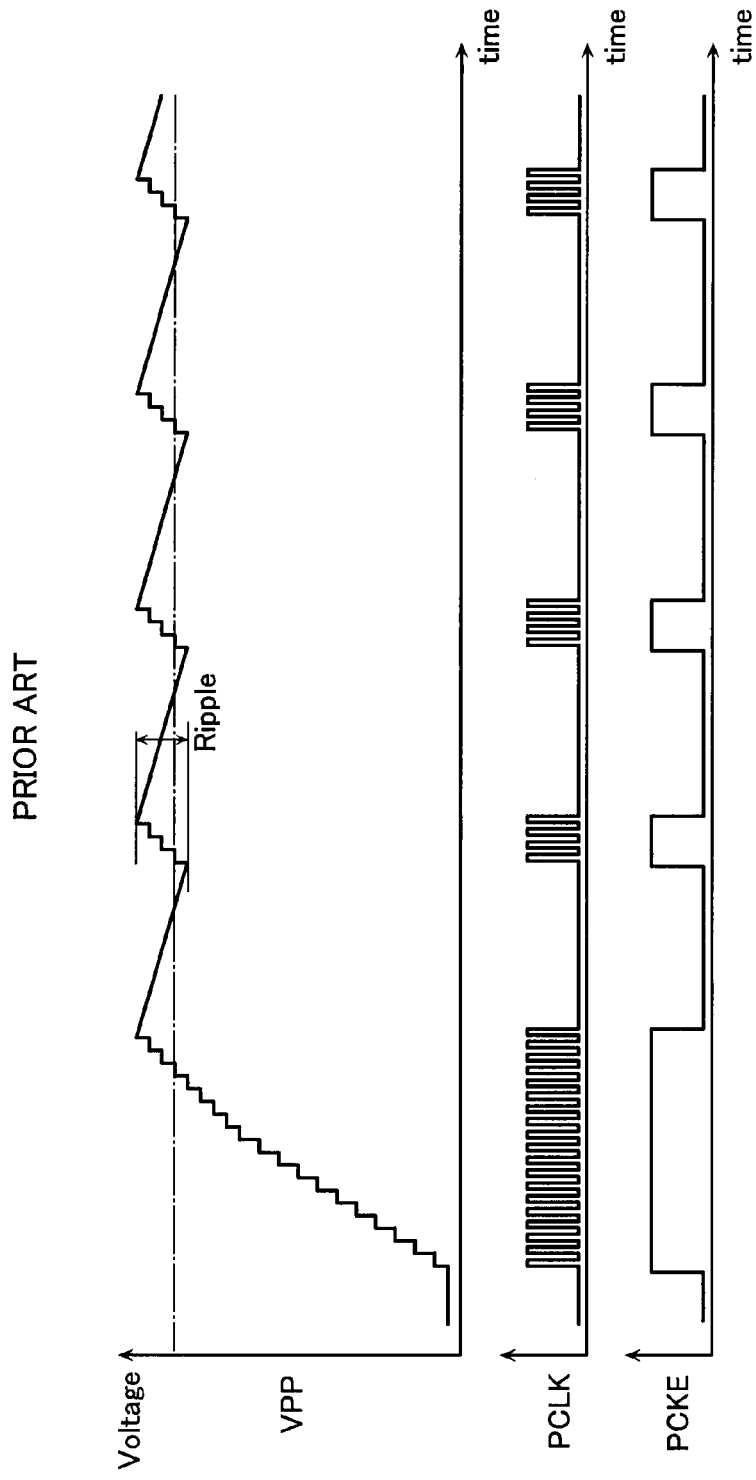
FIG. 3 is an operating waveform of the constant voltage boost power supply.

FIG. 3 is an operating waveform of the on-off control constant voltage boost power supply.

As illustrated in FIG. 3, the output voltage VPP of the on-off control system is characterized in that a rise and a drop are repeated by charging and discharging a decoupling capacitor 5.

The ripple becomes a noise to a circuit to which the output voltage VPP is supplied, and the ripple causes not only characteristic deterioration but also a malfunction at worst. Accordingly, it is necessary to restrain the ripple. The on-off control constant voltage boost power supply can deal with the ripple in a limited fashion by shortening a delay time until the charge pump 302 is operated since the differential amplifier 4 detects that the output voltage VPP is lower than the setting voltage in the state in which the charge pump 302 is stopped and a delay time until the charge pump 302 is stopped since the differential amplifier 4 detects that the output voltage VPP reaches the setting voltage in the state in which the charge pump 302 is operated. However, even in this case, the ripple can further be restrained by increasing a capacitance of the decoupling capacitor 5.

Voltage-Controlled Current Source Constant Voltage Boost Power Supply

Next, constant voltage boost power supplies by other control systems will be described.

Figure 4:
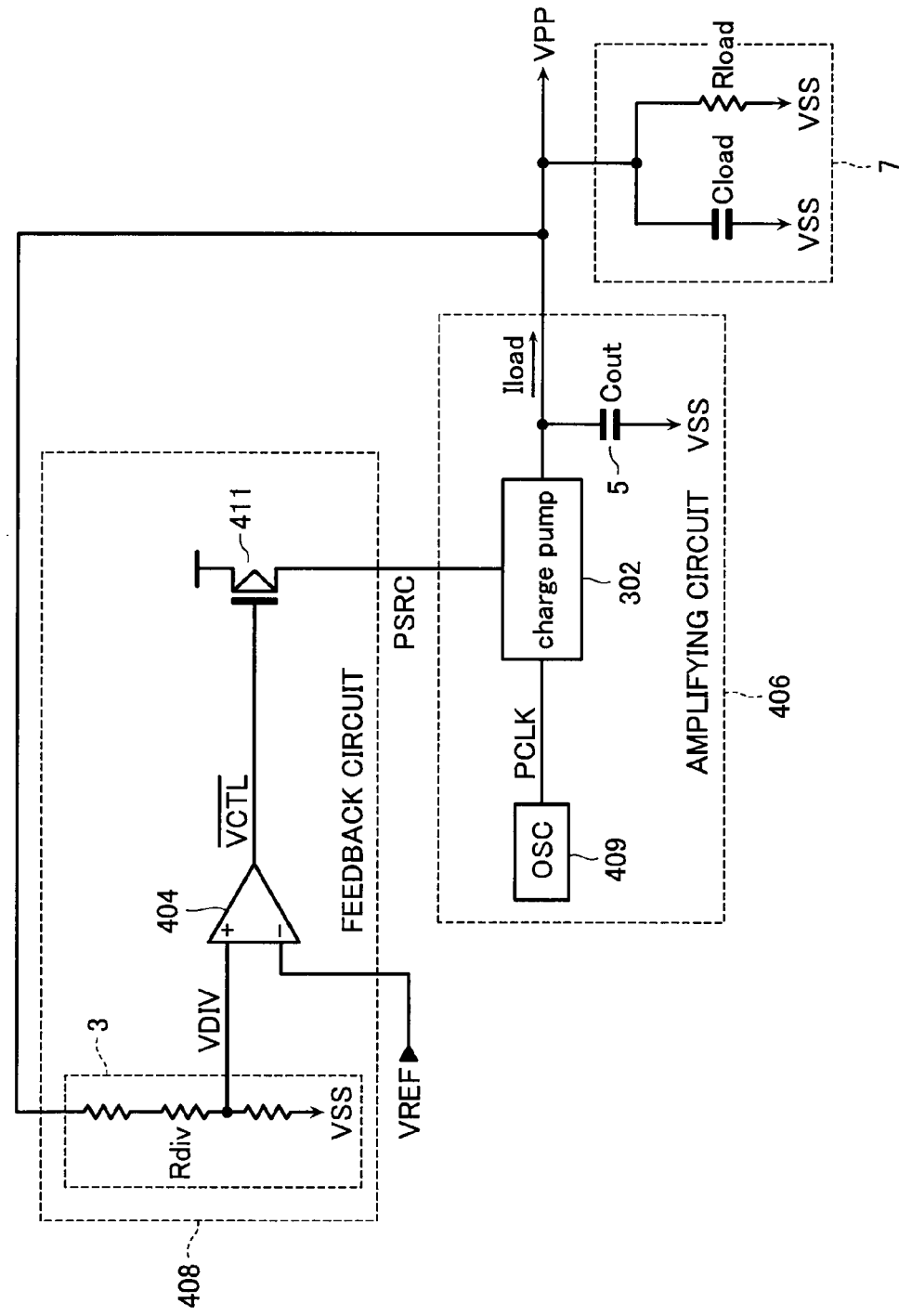
FIG. 4 is a block diagram illustrating a voltage-controlled current source constant voltage boost power supply.

FIG. 4 is a block diagram illustrating a voltage-controlled current source constant voltage boost power supply.

The voltage-controlled constant voltage boost power supply includes an oscillator (OSC) 409 and the charge pump 302. The oscillator 409 steadily oscillates the clock signal PCLK. The charge pump 302 receives the clock signal PCLK, and performs the pumping operation in synchronization with the clock signal PCLK. The voltage-controlled constant voltage boost power supply also includes the voltage dividing circuit 3, a differential amplifier 404, and a PMOS transistor 411. The voltage dividing circuit 3 divides the output voltage VPP of the charge pump 302 with the resistance. In the differential amplifier 404, a noninverting input "+" and an inverting input "−" receive the monitor voltage VDIV that is the output of the voltage dividing circuit 3 and the reference voltage VREF supplied from the outside. The differential amplifier 404 amplifies a potential difference between the inputs to supply a negative-logic control voltage /VCTL (the sign "/" indicates a superior line in FIG. 4). The PMOS transistor 411 is controlled by the control voltage /VCTL. A supply voltage VDD is supplied to a source of the PMOS transistor 411, and a driving voltage PSRC is supplied to the charge pump 302 from a drain of the PMOS transistor 411. That is, a feedback amplifying circuit is formed by an amplifying circuit 406 and a feedback circuit 408. The amplifying circuit 406 includes the charge pump 302, the decoupling capacitor 5, and the oscillator 409. The feedback circuit 408 includes the voltage dividing circuit 3, the differential amplifier 404, and the PMOS transistor 411.

In the constant voltage boost performed by the voltage-controlled current source system, the voltage dividing circuit 3 divides the output voltage VPP to obtain the monitor voltage VDIV, the monitor voltage VDIV and the reference voltage VREF are compared to each other, and a current supplied to the charge pump 302 is controlled by the potential difference between the monitor voltage VDIV and the reference voltage VREF.

Figure 5:
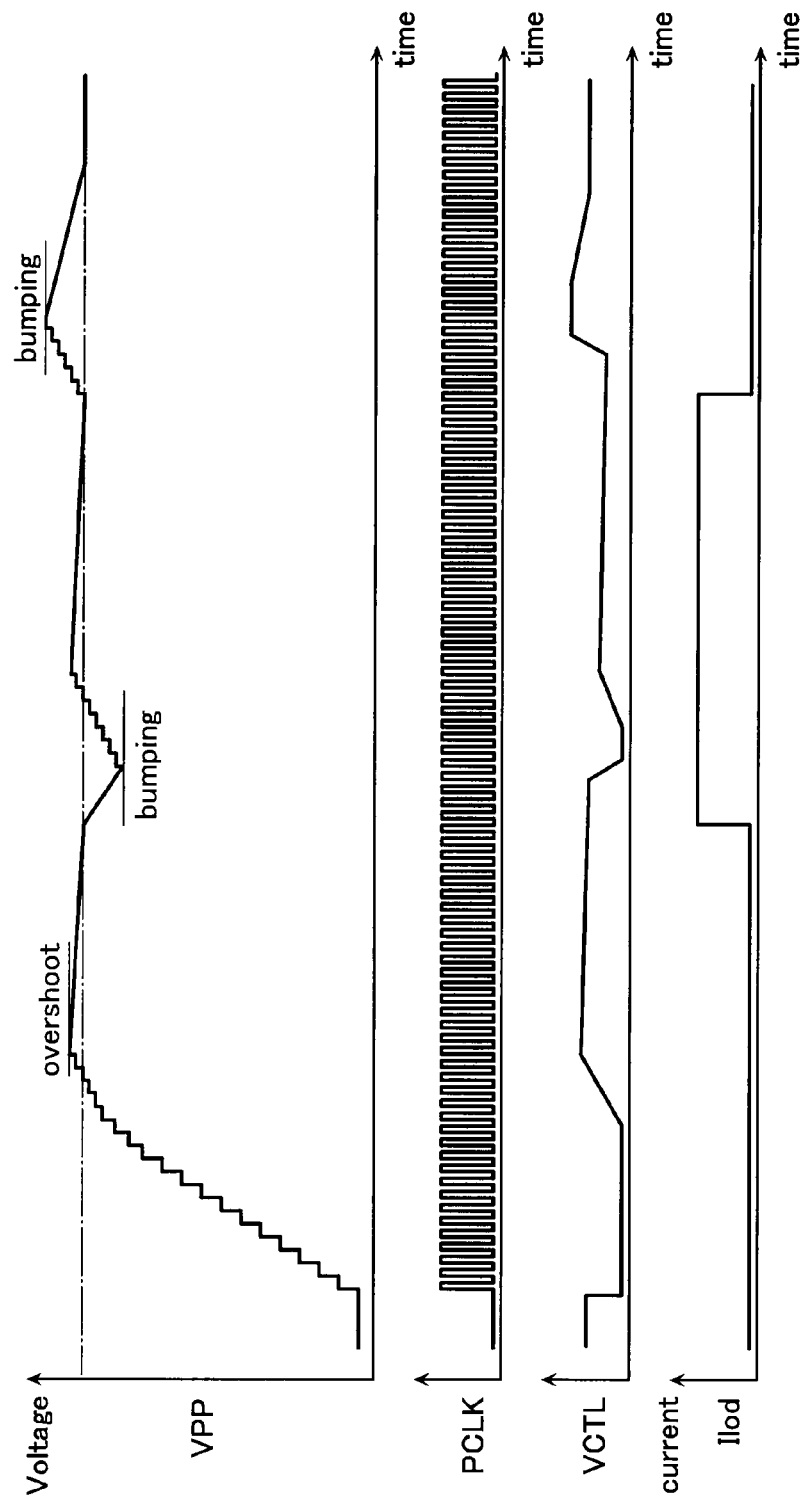
FIG. 5 is an operating waveform of the constant voltage boost power supply.

FIG. 5 is an operating waveform of the voltage-controlled current source constant voltage boost power supply.

As is clear from FIG. 5, in the voltage-controlled current source system, although a bumping phenomenon in which the output voltage drops instantaneously by a rapid change in load current Iload is generated, the ripple generated in the on-off control system of FIG. 3 is restrained.

In the constant voltage boost power supply, stabilization of the feedback amplifying circuit becomes troublesome. In order to solve the problem, one of cutoff frequencies of the amplifying circuit 406 and feedback circuit 408 may be set sufficiently lower than the other. Specifically, in the case of the small load capacitance Cload and the small constant load current Iload, the cutoff frequency of the feedback circuit 408 can be lowered by adding a lowpass filter to the feedback circuit 408.

Frequency Control Constant Voltage Boost Power Supply

As described above, in the on-off control constant voltage boost power supply of FIG. 1, the restraint of the ripple is required, and the capacitance of the decoupling capacitor 5 is increased to restrain the ripple. However, the increase in capacitance of the decoupling capacitor 5 increases a chip area, leading to production cost increase.

For example, in cases where the output voltage VPP of the charge pump having a current supplying capability of 1 mA is controlled with a delay time of 10 ns, the decoupling capacitor 5 having the capacitance of 0.1 nF or more is required to restrain the ripple to 0.1 V or less. In the circuit in which the constant voltage boost power supply is externally provided, generally the capacitor of about 0.1 nF is added in order to stabilize the output voltage VPP. However, in cases where the decoupling capacitor 5 having a capacitance Cout of 0.1 nF and a withstand voltage of 3.3 V is formed by MOS, an area of about 0.025 mm$^2$ is required, and the resultant cost increase is unacceptable as the constant voltage boost power supply incorporated in the semiconductor memory device.

As described above, the voltage-controlled current source constant voltage boost power supply of FIG. 4 has the problem of the stabilization of the feedback amplifying circuit, and the problem can be solved in such a manner that the lowpass filter is added to the feedback circuit 408 to restrain the cutoff frequency of the feedback circuit 408 to a low level. However, when the cutoff frequency of the feedback circuit 408 is lowered, a countermeasure against the change in load current Iload is delayed to generate the larger bumping phenomenon.

A measure for lowering the cutoff frequency of the amplifying circuit 406 compared with the cutoff frequency of the feedback circuit 408 can be cited as another example of the stabilization means. However, it is necessary to add the large-capacity decoupling capacitor 5. Further, the decoupling capacitor 5 having the larger capacity is required as the current supplying capability of the constant voltage boost power supply is increased. The problem of the increased capacity of the decoupling capacitor 5 becomes more serious in the multi-stage Dickson charge pump of FIG. 2 in which the output voltage VPP having a high scaling factor is obtained with respect to the supply voltage.

In the multi-stage Dickson charge pump, the first-stage pumping capacitor 2_C1 is charged with the charges supplied from the voltage-controlled current source, and the charges are discharged to charge the next-stage pumping capacitor 2_C2. The series of operations is sequentially repeated to the final stage in synchronization with the clock signal PCLK, thereby realizing the boost of the supply voltage VDD. Accordingly, the delay is generated in proportion to a product of the number of stages of the Dickson charge pump and an oscillation period of the clock signal PCLK until the effect of the control to the voltage-controlled current source is exhibited in the output voltage VPP. The delay caused by the charge transfer is added to a delay of feedback control, and the delay becomes a factor that the cutoff frequency of the feedback circuit 408 cannot be set to a sufficiently high value. For example, in the four-stage Dickson charge pump operated at a frequency of 100 MHz, the cutoff frequency of the feedback circuit 408 cannot be set to 50 MHz or more.

Accordingly, it is necessary that the cutoff frequency of the amplifying circuit 406 be restrained to an extremely low value. In cases where the feedback circuit 408 has the cutoff frequency of 50 MHz, it is necessary that the cutoff frequency of the amplifying circuit 406 be restrained to about 10 MHz or less. In such cases, the decoupling capacitor 5 having the capacitance of 0.1 nF or more is required in the constant voltage boost power supply having the maximum current supplying capability of 1 mA.

Thus, the decoupling capacitor 5 having the capacitance that is equal to or more than that of the on-off control current source constant voltage boost power supply is required in the voltage-controlled current source constant voltage boost power supply.

A frequency control constant voltage boost power supply can be cited as an example of the constant voltage boost power supply that solves the problems of the on-off control system and voltage-controlled current source system.

Figure 6:
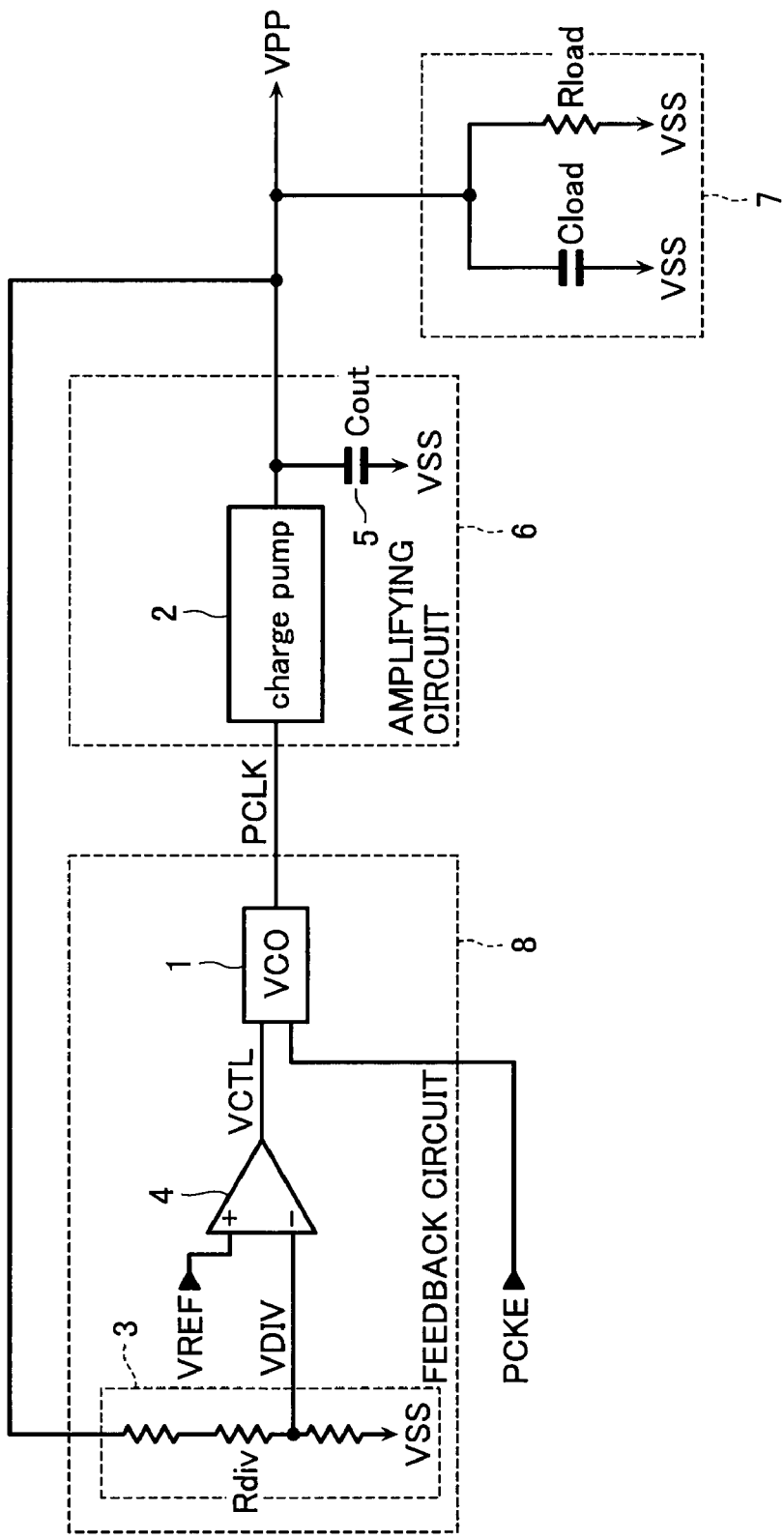
FIG. 6 is a block diagram illustrating a constant voltage boost power supply according to a first embodiment of the invention.

FIG. 6 is a block diagram illustrating a constant voltage boost power supply according to a first embodiment of the invention. The frequency control constant voltage boost power supply of FIG. 6 is suitable to the internal power supply of the semiconductor memory device.

The frequency control constant voltage boost power supply includes a voltage-controlled variable frequency oscillator (VCO) 1 and a charge pump 2. In the voltage-controlled variable frequency oscillator 1, the oscillating frequency is raised when the control voltage VCTL becomes higher, and the oscillating frequency is lowered when the control voltage VCTL becomes lower. The charge pump 2 receives the clock signal PCLK that is the output of the voltage-controlled variable frequency oscillator 1, and performs the pumping operation in synchronization with the clock signal PCLK. The frequency control constant voltage boost power supply also includes the voltage dividing circuit 3 and the differential amplifier 4. The voltage dividing circuit 3 divides the output voltage VPP of the charge pump 2 with the resistance. In the differential amplifier 4, the inverting input "−" and the non-inverting input "+" receive the monitor voltage VDIV that is the output of the voltage dividing circuit 3 and the reference voltage VREF supplied from the outside. The differential amplifier 4 amplifies the potential difference between the inputs to supply the control voltage VCTL.

It can be considered that the frequency control constant voltage boost power supply is a feedback amplifying circuit including an amplifying circuit 6 and a feedback circuit 8. The amplifying circuit 6 includes the charge pump 2, and the feedback circuit 8 includes the voltage dividing circuit 3, the differential amplifier 4, and the voltage-controlled variable frequency oscillator 1. In order to ensure the stability of the feedback amplifying circuit (phase compensation), the decoupling capacitor 5 having the capacitance Cout is added to the output as needed.

A cutoff frequency Fa of the amplifying circuit 6 can roughly be expressed as follows by an inverse number of a time constant (product of capacitance and resistance) of a circuit, in which the capacitance Cout of the decoupling capacitor 5, the capacitance component Cload of the load 7, an internal resistance Rout (not illustrated) of the amplifying circuit 6, a resistance component Rload of the load 7, and a resistance Rdiv of the voltage dividing circuit 3 are connected in parallel.

$$Fa = \frac{Rout \times Rload + Rload \times Rdiv + Rdiv \times Rout}{(Rout \times Rload \times Rdiv) \times (Cout + Cload)} \quad \text{[Formula 1]}$$

Each circuit constant is set such that the cutoff frequency Fa of the amplifying circuit 6 is sufficiently larger than an inverse number of the summation of reaction times of the voltage dividing circuit 3, differential amplifier 4, and voltage-controlled variable frequency oscillator 1, that is, a cutoff frequency Ff of the feedback circuit 8. Therefore, the output voltage VPP can stably be maintained. A specific example will be described below.

It is assumed that the output voltage VPP is 5 V, the load capacitance Cload of the output voltage VPP is 1 pF, and the maximum load current Iload is 1 mA.

The load resistance Rload is obtained from Rload=VPP/Iload, and is 5 kΩ. Similarly, in the charge pump 2, because of maximum load current Iload=1 mA, the internal resistance Rout of the amplifying circuit 6 is obtained from Rout=VPP/Iload, and is 5 kΩ. It is also necessary to determine the resistance value Rdiv of the voltage dividing circuit 3. As described later, because the resistance value Rdiv becomes a factor that determines the cutoff frequency Ff of the feedback circuit 8, it is assumed that the resistance value Rdiv is 50 kΩ. It is believed that the load capacitance Cload of 1 pF is changed according to the load status. Accordingly, it is assumed that the decoupling capacitor 5 having the capacitance of 2 pF double the load capacitance Cload of 1 pF is tentatively added.

The cutoff frequency Fa of 140 MHz can be obtained when the cutoff frequency Fa of the amplifying circuit 6 is computed from each constant using the following equation:

$$Fa = \frac{5k \times 5k + 5k \times 50k + 50k \times 5k}{(5k \times 5k \times 50k) \times (2p + 1p)} \quad \text{[Formula 2]}$$

In cases where the decoupling capacitor 5 is formed by MOS having the withstand voltage of 5 V, the decoupling capacitor 5 has an area of 1000 μm². Therefore, the cost increase can be kept within the sufficiently acceptable range as the internal power supply.

In order to ensure the stability of the feedback amplifying circuit, it is necessary that the cutoff frequency Ff of the feedback circuit 8 be sufficiently larger than the cutoff frequency Fa of the amplifying circuit 6. At this point, the cutoff frequency Ff of 500 MHz is used as a target for the stable operation, and the cutoff frequency Ff of 500 MHz is at least triple the cutoff frequency Fa of 140 MHz of the amplifying circuit 6.

Figure 7:
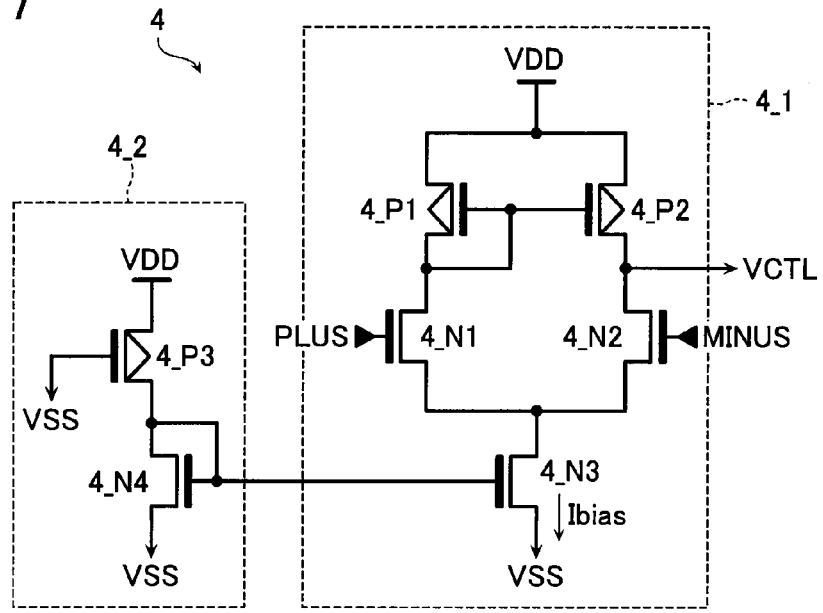
FIG. 7 is a circuit diagram illustrating a differential amplifier of the first embodiment.

First, a time constant is determined from the resistance value Rdiv of the voltage dividing circuit 3 and a parasitic capacitance Cdiv (not illustrated). At this point, an input capacitance Cplus (not illustrated) of the differential amplifier 4 is considered with reference to the circuit diagram of FIG. 7 illustrating the differential amplifier 4 of the first embodiment.

The differential amplifier 4 includes a differential input unit 4_1 and a bias circuit 4_2 that controls a bias current Ibias passed through the differential input unit 4_1.

The differential input unit 4_1 includes a differential input pair, and the differential input pair includes an NMOS transistor 4_N1 and an NMOS transistor 4_N2. The noninverting input PLUS ("+" in FIG. 6) is connected to a gate of the NMOS transistor 4_N1. The inverting input MINUS ("−" in FIG. 6) is connected to a gate of the NMOS transistor 4_N2. Sources of the NMOS transistors 4_N1 and 4_N2 are connected to the ground line that is at the level of the ground voltage VSS through an NMOS transistor 4_N3. Drains of the NMOS transistors 4_N1 and 4_N2 are connected to the power supply line that is at the level of the supply voltage VDD through PMOS transistors 4_P1 and 4_P2 that constitute the loads. Gates of the PMOS transistors 4_P1 and 4_P2 are connected to a drain of the NMOS transistor 4_N1.

The bias circuit 4_2 includes a PMOS transistor 4_P3 and an NMOS transistor 4_N4. A source of the PMOS transistor 4_P3 is connected to the power supply line that is at the level of the supply voltage VDD, and a gate of the PMOS transistor 4_P3 is connected to the ground line that is at the level of the ground voltage VSS. A source of the NMOS transistor 4_N4 is connected to the ground line that is at the level of the ground voltage VSS, and a drain and a gate of the NMOS transistor 4_N4 are connected to a drain of the PMOS transistor 4_P3. A gate of the NMOS transistor 4_N3 of the differential amplifying unit 4_1 is connected to the gate of the NMOS transistor 4_N4 of the bias circuit 4_2, and the NMOS transistors 4_N3 and 4_N4 constitute a current mirror circuit.

Therefore, the drains of the NMOS transistor 4_N2 and PMOS transistor 4_P2 of the differential input unit 4 constitute the control voltage VCTL that is the output of the differential amplifier 4.

In the differential amplifier 4, the gate areas of the NMOS transistors 4_N1 and 4_N2 cannot extremely be reduced because of a symmetrical property. Therefore, the NMOS transistor having the channel width of 4 μm and the channel length of 1 μm is selected. The gate capacitance becomes about 15 fF in the 3.3V-withstand-voltage NMOS transistor having the channel width of 4 μm and the channel length of 1 μm. Additionally, the parasitic capacitance Cdiv of several femtofarads is added. In such cases, the time constant of the voltage dividing circuit 3 can be restrained to 1 ns or less by setting the resistance value Rdiv of the voltage dividing circuit 3 to about 50 kΩ.

Next, an operation delay time of the differential amplifier 4 will be described.

As described above, the NMOS transistors 4_N1 and 4_N2 of the differential input unit 4_1 have the channel width of 4 μm and the channel length of 1 μm. Similarly, the PMOS transistors 4_P1 and 4_P2 of the differential input unit 4_1 have the channel width of 8 μm and the channel length of 0.5 μm in order to maintain the symmetrical property. The bias current Ibias of about 100 μA is passed through the differential amplifier 4. At this point, the differential amplifier 4 has the operation delay time of about 0.6 ns.

Finally, the operation delay time of the voltage-controlled variable frequency oscillator 1 will be described. A multivibrator of FIG. 8 to which the variable current element is added can be used as the voltage-controlled variable frequency oscillator 1.

The voltage-controlled variable frequency oscillator 1 includes a pair of NAND gates 1_G3 and 1_G4, NAND gates 1_G1 and 1_G2, inverters 1_IV1 and 1_IV2, and two-stage inverters 1_IV3 and 1_IV5 and 1_IV4 and 1_IV6. The pair of NAND gates 1_G3 and 1_G4 is connected in a flip-flop manner. The NAND gates 1_G1 and 1_G2 are connected to inputs of gates of the NAND gates 1_G3 and 1_G4, and the NAND gates 1_G1 and 1_G2 control a start and a stop of oscillation using the oscillation enable signal PCKE. The inverters 1_IV1 and 1_IV2 are connected to inputs of the NAND gates 1_G1 and 1_G2. The two-stage inverters 1_IV3 and 1_IV5 and 1_IV4 and 1_IV6 are connected to outputs of the NAND gates 1_G3 and 1_G4, respectively. The outputs of the inverters 1_IV3 and 1_IV4 are fed back to the inputs of the input-stage inverters 1_IV1 and 1_IV2 through delay circuits, respectively. One of the delay circuits includes a PMOS transistor 1_P1, NMOS transistors 1_N1 and 1_N3, and a capacitor 1_C1. The PMOS transistor 1_P1 and the NMOS transistors 1_N1 and 1_N3 are connected in series between the power supply line VDD and the ground line VSS. The capacitor 1_C1 is connected between a connection end of the transistors 1_P1 and 1_N1 and the ground line VSS. The other delay circuit includes a PMOS transistor 1_P2, NMOS transistors 1_N2 and 1_N4, and a capacitor 1_C2. The PMOS transistor 1_P2 and the NMOS transistors 1_N2 and 1_N4 are connected in series between the power supply line VDD and the ground line VSS. The capacitor 1_C2 is connected between a connection end of the transistors 1_P2 and 1_N2 and the ground line VSS.

Therefore, the clock signal PCLK is supplied from an output of the inverter 1_IV5 to the charge pump 2.

Figure 8:
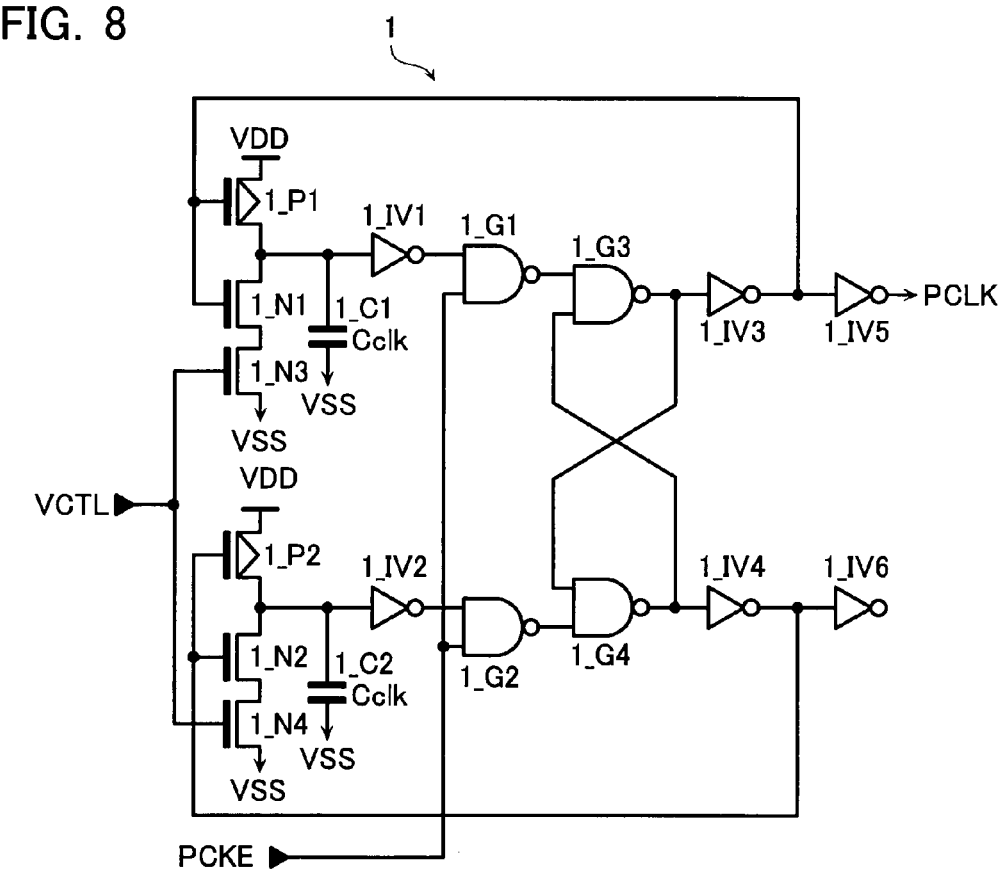
FIG. 8 is a circuit diagram illustrating a voltage-controlled variable frequency oscillator of the first embodiment.

In the voltage-controlled variable frequency oscillator 1, the NMOS transistors 1_N3 and 1_N4 that are the variable current elements control the oscillating frequency of the clock signal PCLK. The multivibrator of FIG. 8 is mainly formed by the high-speed logic gate circuit, so that the maximum oscillating frequency of the multivibrator can easily be set to about 1 GHz. For example, in order to set the maximum oscillating frequency of the multivibrator to about 1 GHz, capacitances Cclk of the capacitors 1_C1 and 1_C2 constituting the delay circuits may be set to about 10 fF, and maximum current amounts of the NMOS transistors 1_N3 and 1_N4 that receive the control voltage VCTL may be set to about 20 μA. In such cases, the NMOS transistors 1_N3 and 1_N4 have the channel width of 1 μm and the channel length of about 1 μm. Because the input load capacitance becomes about 5 fF, the differential amplifier 4 can perform the control at sufficiently high speed.

Thus, the design can be made such that the total delay time of the voltage dividing circuit 3, differential amplifier 4, and voltage-controlled variable frequency oscillator 1 is set to about 2 ns, that is, the cutoff frequency Ff of the feedback circuit 8 is set to about 500 MHz.

Then the charge pump 2 will be described.

Figure 9:
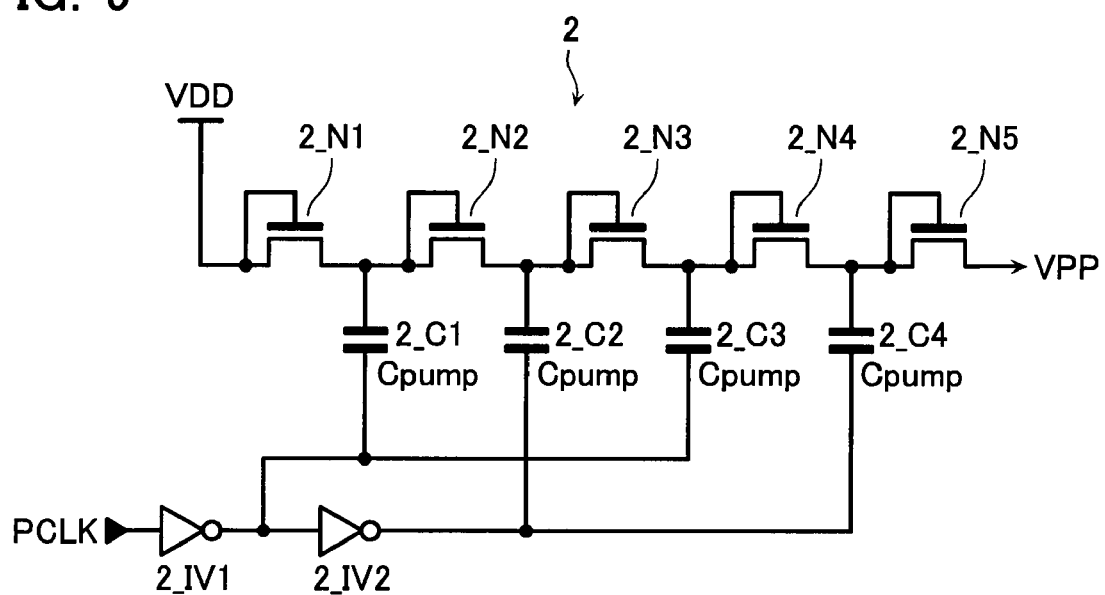
FIG. 9 is a circuit diagram illustrating a Dickson charge pump of the first embodiment.

FIG. 9 is a circuit diagram illustrating the charge pump 2 of the first embodiment.

In the charge pump 2, five NMOS transistors 2_N1 to 2_N5, in which a drain and a gate are connected, are connected in series. The drain of the first-stage NMOS transistor 2_N1 is connected to the power supply line that is at the level of the supply voltage VDD. The source of the NMOS transistor 2_Ni (i is an integer of 1 to 4) and the drain of the NMOS transistor 2_Ni+1 are connected to each other.

One end of each of the pumping capacitors 2_C1 to 2_C4 having the capacitance Cpump is connected to the source of each of the NMOS transistors 2_N1 to 2_N4. The clock signal PCLK supplied from the outside is supplied to the other end of each of the capacitors 2_C1 and 2_C3 through the inverter 2_IV1, and to the other end of each of the capacitors 2_C2 and 2_C4 through the inverters 2_IV1 and 2_IV2.

The charge pump 2 is the four-stage Dickson charge pump, and the output voltage VPP that is 2.5 times the supply voltage VDD is supplied from the drain of the NMOS transistor 2_N5. For example, in the case of the supply voltage VDD of 2.5 V, the output voltage VPP becomes up to about 6.25 V.

The Dickson charge pump 302 of FIG. 2 can similarly be used.

Actually the maximum boost capability of the charge pump 2 is influenced by threshold voltages Vtn of rectifying elements 2_N1 to 2_N5, and the boost capability is deteriorated when the threshold voltage Vtn is high. At this point, the boost capability can be ensured using means for actively controlling the gate of the NMOS transistor. Even if the boost capability is further deficient, the number of stages of the charge pump 2 may be increased.

A design example of the charge pump 2 will be described below.

Target specifications of the charge pump 2 are set to the output voltage VPP of 5 V and the current supplying capability of 1 mA in the case of the supply voltage VDD of 2.5 V and the clock signal PCLK of 1 GHz. The charge pump 2 is expected to have the maximum output voltage of about 6 V, so that the output voltage VPP of 5 V can be obtained. In order to obtain the current supplying capability of 1 mA, with a slight margin, the channel widths of the NMOS transistors 2_N1 to 2_N5 that are the rectifying elements are set to 100 μm, and the channel lengths are set to 0.3 μm. The capacitances Cpump of the pumping capacitors 2_C1 to 2_C4 are set to 2 pF. Each of the pumping capacitors 2_C1 to 2_C4 has the area of about 500 μm$^2$ when the 2-pF pumping capacitors 2_C1 to 2_C4 are formed by MOS.

A voltage control operation of the first embodiment will be described.

Figure 10:
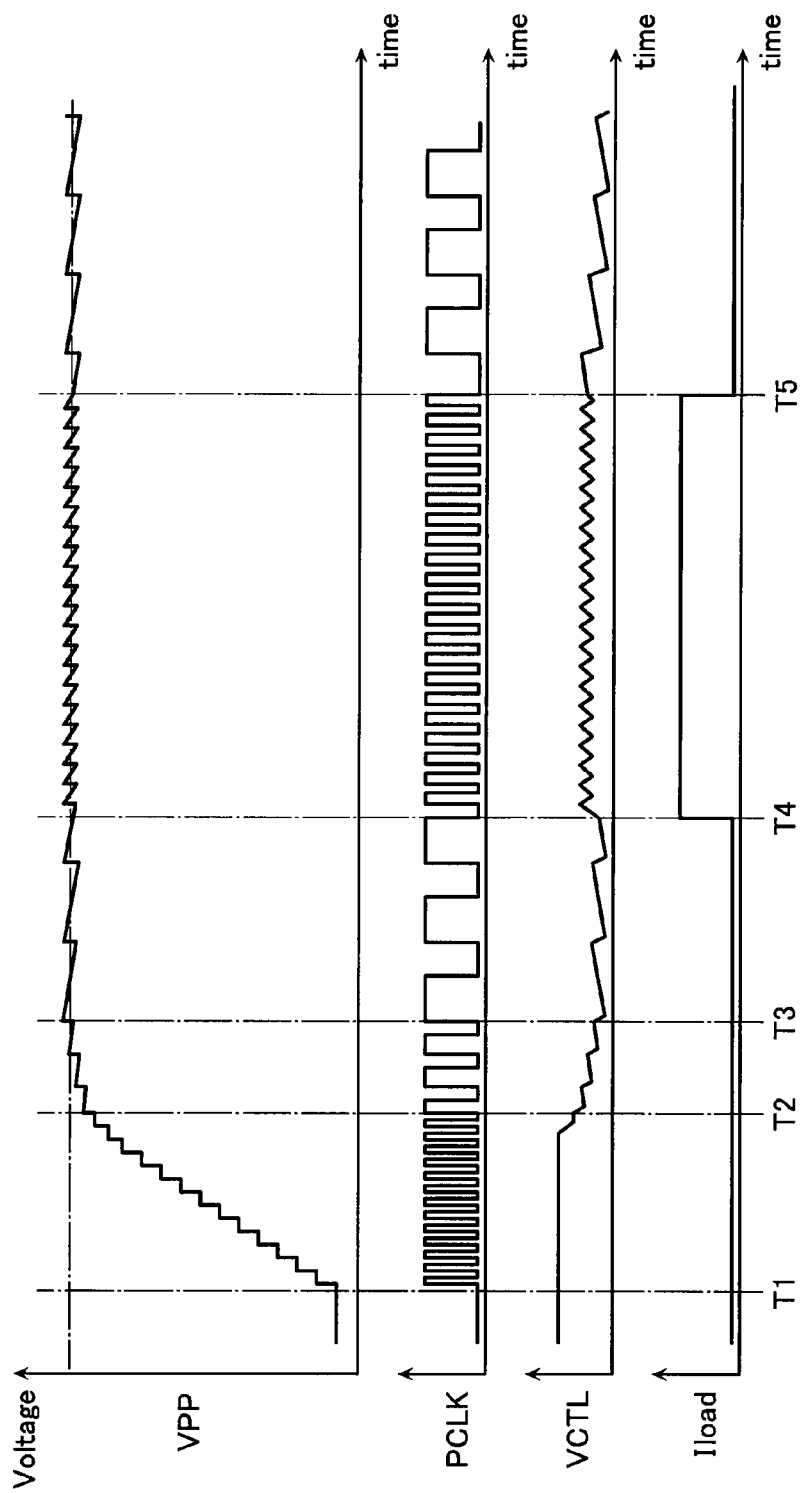
FIG. 10 is an operating waveform of the first embodiment.

FIG. 10 is an operating waveform of the first embodiment.

Before a time T1 of FIG. 10, the oscillating operation of the voltage-controlled variable frequency oscillator 1 is prevented by the externally-supplied oscillation enable signal PCKE (not illustrated), and the clock signal PCLK that is the output of the voltage-controlled variable frequency oscillator 1 is maintained in an "L" state. Accordingly, the charge pump 2 that is activated by receiving the clock signal PCLK is in a stopped state, and the output voltage VPP becomes substantially 0 V.

At the time T1, the oscillation enable signal PCKE is activated to start the oscillating operation of the voltage-controlled variable frequency oscillator 1. At this point, the output voltage VPP is substantially 0 V that is largely lower than the setting voltage. Therefore, the control voltage VCTL that is the output of the differential amplifier 4 becomes a high voltage that is nearly equal to the supply voltage VDD supplied from the outside. The oscillating frequency of the clock signal PCLK supplied from the voltage-controlled variable frequency oscillator 1 is extremely raised according to the control voltage VCTL. The charge pump 2 that is operated in response to the clock signal PCLK supplies a current exceeding the load current Iload. As a result, the output voltage VPP is rapidly raised.

At a time T2, the output voltage VPP is brought close to the setting voltage, thereby gradually lowering the control voltage VCTL. Therefore, the oscillating frequency of the clock signal PCLK that is supplied from the voltage-controlled variable frequency oscillator 1 is also gradually lowered, and the current supply of the charge pump 2 is gradually reduced.

At a time T3, a balance is established between the current supply of the charge pump 2 and the load current Iload. Then the oscillating frequency of the clock signal PCLK is stabilized in a low frequency state.

At a time T4, the load current Iload is rapidly increased by an external factor. The output voltage VPP drops slightly by the influence of the rapidly increased load current Iload. The differential amplifier 4 detects the phenomenon to rapidly raise the control voltage VCTL. Therefore, the oscillating frequency of the clock signal PCLK that is supplied from the voltage-controlled variable frequency oscillator 1 is increased again. The increased oscillating frequency of the clock signal PCLK instantaneously increases the current supply of the charge pump 2.

On the contrary, when the load current Iload is rapidly decreased at a time T5, because the differential amplifier 4 promptly detects the phenomenon, the control voltage VCTL drops rapidly. The oscillating frequency of the clock signal PCLK that is the output of the voltage-controlled variable frequency oscillator 1 is lowered, thereby rapidly decreasing the current supply of the charge pump 2.

As described above, the voltage control system of the first embodiment is the analog feedback, and the boost power supply having the stable voltage characteristic can be obtained by appropriately designing the gain and the reaction speed (cutoff frequency) of the control system. Advantageously, an overshoot (phenomenon in which the output voltage is higher than the setting voltage in a moment immediately after the power-on) that is generated in other control systems can be prevented.

In the balanced state between the current supply of the charge pump 2 and the load current Iload, the ripple is generated in the output voltage VPP by the pumping operation of the charge pump 2. However, the voltage of the ripple is much smaller than that of other control systems. Just for reference, the ripple of the first embodiment is much smaller than that of the operating waveform of the on-off control constant voltage boost power supply illustrated in FIG. 2.

Further, the bumping phenomenon, in which the output voltage becomes lower or higher for a moment due to the rapid change in load current Iload, can also be restrained. Particularly the effect becomes prominent when the Dickson charge pump having the many stages is used. For example, in the on-off control system in which the clock signal PCLK is completely stopped, the charges accumulated in the pumping capacitor of the Dickson charge pump are lost while the clock signal PCLK is stopped, and the current supply is extremely lowered immediately after the pumping operation is re-started. Even if the analog voltage control is performed, in the system in which the amount of current supplied to the Dickson charge pump is controlled, a large delay is generated until the output current amount of the charge pump is increased since the supplied current amount is increased. Therefore, in the conventional constant voltage boost power supply, the control cannot follow the rapid increase in load current, and the large bumping is generated. In order to reduce the large bumping, the capacitance of the decoupling capacitor is increased. However, the chip area is enlarged when the capacitance of the decoupling capacitor is increased. On the other hand, in the first embodiment, the output current amount can be increased by instantaneously responding to the rapid increase in load current, so that the bumping can be restrained to a small level. Accordingly, it is not necessary to add the decoupling capacitor.

As described above, the constant voltage boost power supply, in which the stability of the output voltage is improved by reducing the ripple and the production cost reduction is realized by reducing the area of the decoupling capacitor, can be provided in the first embodiment.

Second Embodiment

Figure 11:
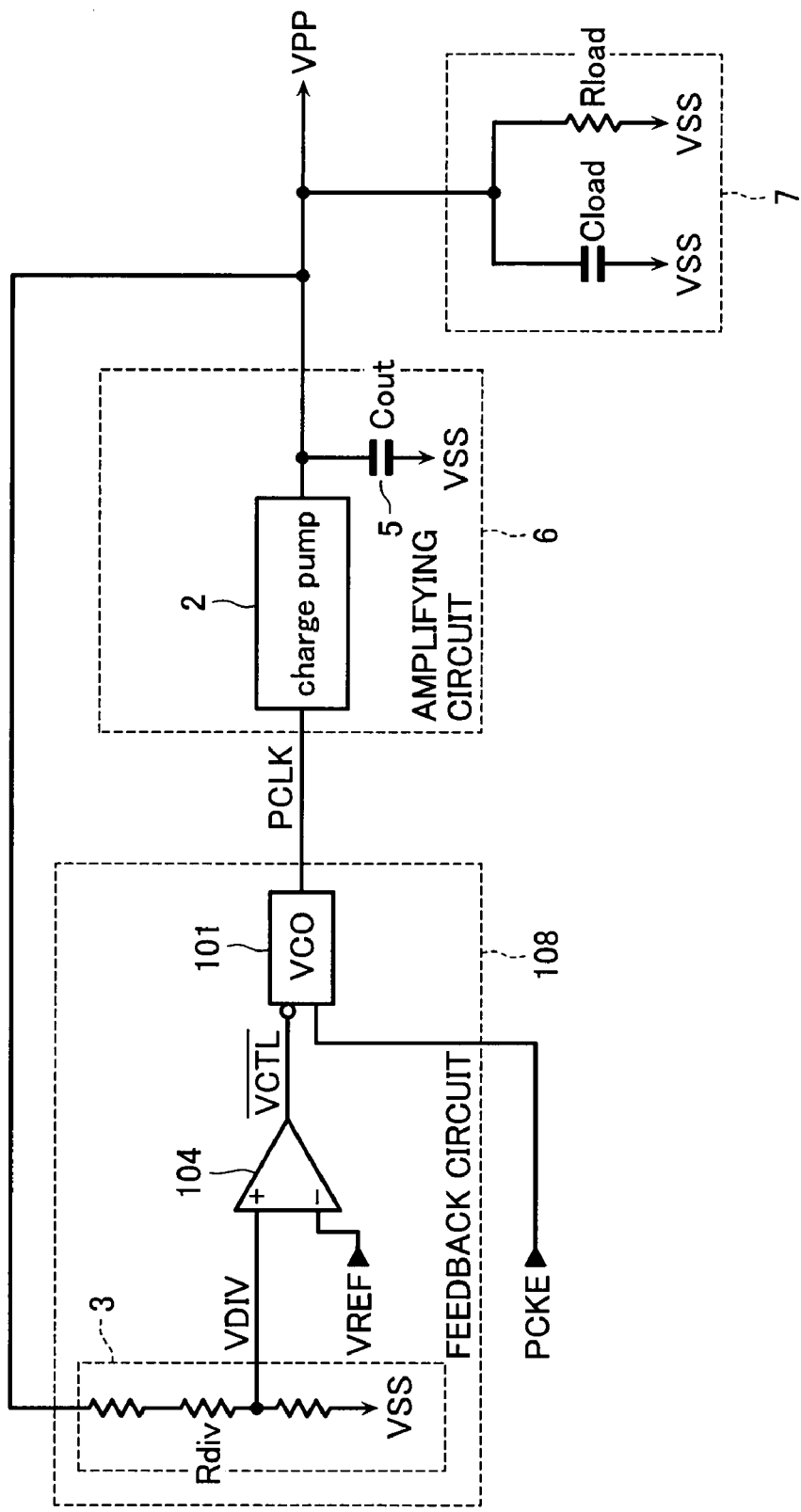
FIG. 11 is a block diagram illustrating a constant voltage boost power supply according to a second embodiment of the invention.

FIG. 11 is a block diagram illustrating a constant voltage boost power supply according to a second embodiment of the invention.

In the constant voltage boost power supply of the second embodiment, the stability of the output voltage VPP is further improved compared with the first embodiment.

An entire configuration of the constant voltage boost power supply of the second embodiment is substantially similar to that of the first embodiment. Points different from those of the first embodiment will mainly be described below.

The configuration of the constant voltage boost power supply of the second embodiment differs from that of the first embodiment in that the monitor voltage VDIV of the voltage dividing circuit 3 is fed into a noninverting terminal "+" of a differential amplifier 104 described later while the reference voltage VREF is fed into an inverting input "−". Therefore, the control voltage /VCTL (the sign "/" indicates a superior line in FIG. 11) that is the output of the differential amplifier 104 has a polarity opposite to the first embodiment. That is, the higher control voltage /VCTL is supplied when the output voltage VPP is higher than the setting voltage, and the lower control voltage /VCTL is supplied when the output voltage VPP is lower than the setting voltage. In response to the control voltage /VCTL, a frequency of the clock signal PCLK that is the output of the voltage-controlled variable frequency oscillator 101 is lowered when the control voltage /VCTL becomes higher, and the frequency of the clock signal PCLK is raised when the control voltage /VCTL becomes lower.

In order to ensure the stability of the output voltage VPP of the constant voltage boost power supply, as described above, it is necessary to restrain a delay of a feedback circuit 108. Further, it is necessary that a gain ACL of the differential amplifier 104 included in the feedback circuit 108 be appropriately set in order to improve the stability of the system. The oscillation is difficult to prevent when the gain ACL of the differential amplifier 104 is excessively increased. On the contrary, when the gain ACL is excessively decreased, a load characteristic of the constant voltage boost power supply is deteriorated, and the increase in load current Iload lowers the output voltage VPP.

The open-loop differential amplifier 4 of FIG. 7 is used in the first embodiment. In the first embodiment, the gain and the cutoff frequency can be set by adjusting the channel length and channel width of the MOS transistor. However, the electrical characteristic of the MOS transistor fluctuates largely by the influence of the variation of the production process, and the gain and the cutoff frequency are hardly set to desired values.

The closed-loop differential amplifier is effectively used to solve the problem.

Figure 12:
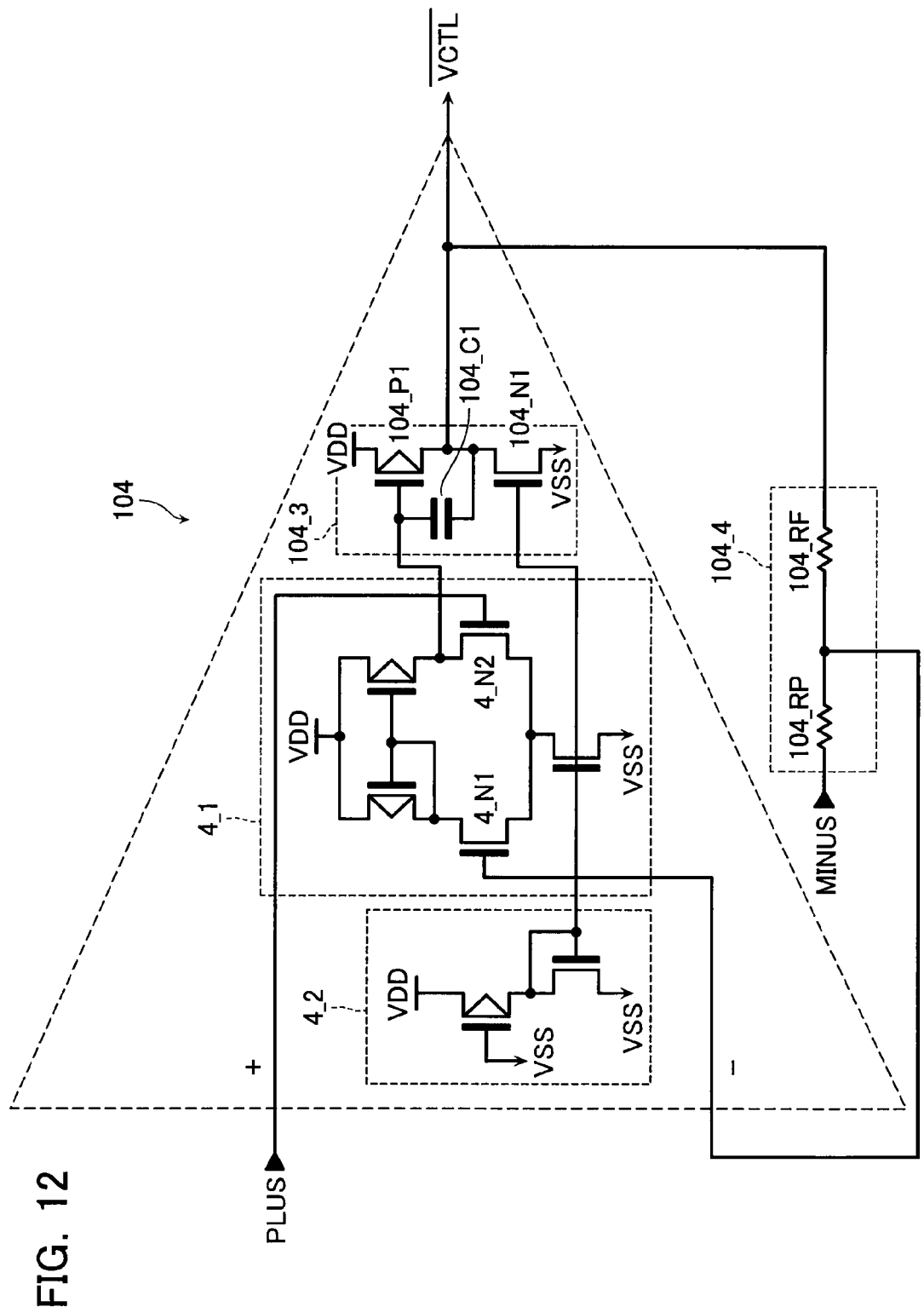
FIG. 12 is a circuit diagram illustrating a differential amplifier of the second embodiment.

FIG. 12 is a circuit diagram illustrating the differential amplifier 104 of the second embodiment.

The differential amplifier 104 includes support circuits such as an amplifying unit 104_3 and a feedback circuit 104_4 in addition to a differential input unit 4_1 and a bias circuit 4_2.

Although the differential input unit 4_1 has the configuration similar to that of the differential amplifier 4 of FIG. 7, the differential input unit 4_1 differs from the differential amplifier 4 in that the noninverting input PLUS is connected to a gate of an NMOS transistor 4_N2 while a voltage obtained by dividing the input voltage at the noninverting input MINUS and a voltage obtained by dividing the supplied control voltage /VCTL are fed back to an NMOS transistor 4_N1 through a feedback circuit 104_4.

The amplifying unit 104_3 includes MOS transistors 104_P1 and 104_N1, which are provided between the power supply line that is at the level of the supply voltage VDD and the ground line that is at the level of the ground voltage VSS. The output voltage of the differential input unit 4_1 is supplied to a gate of the PMOS transistor 104_P1. A gate of the NMOS transistor 104_N1 is commonly connected to a gate of an NMOS transistor 4_N3 of the differential input unit 4_1 and a gate of an NMOS transistor 4_N4 of the bias circuit 4_2. A capacitor 104_C1 that is a phase compensating circuit is connected between the drain and gate of the PMOS transistor 104_P1. The drains of the MOS transistors 104_P1 and 104_N1 of the amplifying unit 104_3 constitute the control voltage /VCTL that is the output of the differential amplifier 104.

The feedback circuit 104_4 includes resistances 104_RF and 104_RP, which are connected in series between an output of the amplifying unit 104_3 and the inverting input MINUS. Connection ends of the resistances 104_RF and 104_RP are connected to the gate of the NMOS transistor 4_N1 of the differential input unit 4_1.

In the differential amplifier 104 having the configuration of FIG. 12, a combination of the differential input unit 4_1 and the amplifying unit 104_3 seems to be an open-loop differential amplifier. When the open-loop differential amplifier partially constituting the differential amplifier 104 has the sufficiently large gain AO, the gain ACL of the differential amplifier 104 can be expressed as follows:

$$ACL = \frac{104\_RF + 104\_RP}{104\_RP} \qquad \text{[Formula 3]}$$

The gain ACL substantially becomes 100 under the conditions of 104_RP of 1 kΩ, 104_RF of 99 kΩ, and the gain AO of 1000 or more.

Generally a resistance ratio of the resistive element is hardly influenced by the variation of the production process. The gain AO of the open-loop differential amplifier is easily increased. For example, the channel width of the MOS transistor constituting the open-loop differential amplifier is increased, the channel length of the MOS transistor is decreased, and the current supplied to the channel is set larger, whereby the gain AO can be set to 1000 or more.

Advantageously, the gain ACL of the closed-loop differential amplifier 104 is hardly influenced by the variation of the production process, and the closed-loop differential amplifier 104 is always stably operated.

At the same time, in the closed-loop differential amplifier 104, disadvantageously input impedance of the terminal connected to the feedback circuit 104_4 is lowered due to the influence of the feedback circuit 104_4. When the monitor voltage VDIV of the voltage dividing circuit 3 is connected to the low-input-impedance inverting differential input MINUS, a large error is generated in the voltage control. This is because the low-input-impedance input MINUS cannot be driven. In the second embodiment, in order to avoid the problem, the reference voltage VREF is fed into the low-input-impedance inverting differential input MINUS while the monitor voltage VDIV of the voltage dividing circuit 3 is fed into the high-input-impedance noninverting differential input PLUS.

Figure 13:
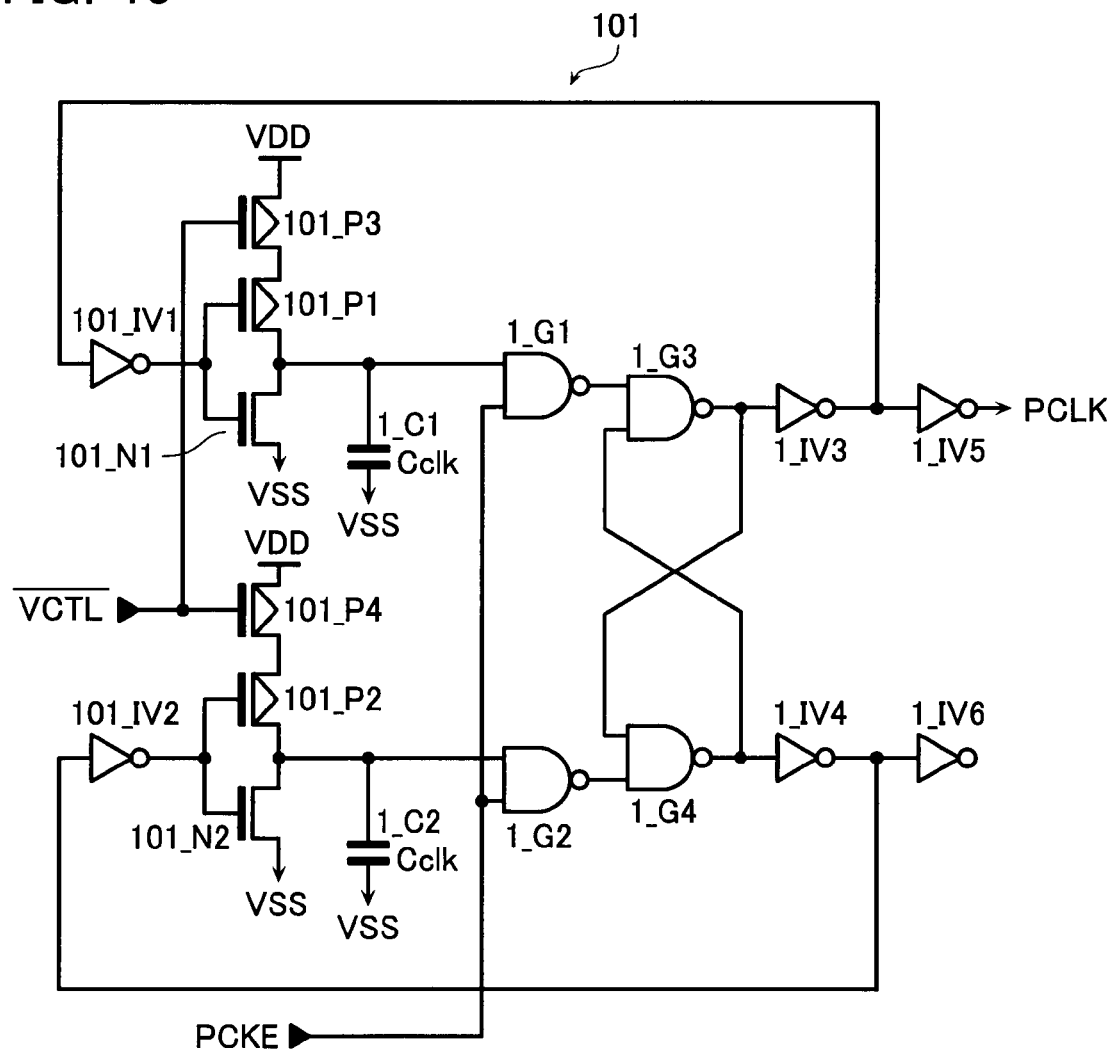
FIG. 13 is a circuit diagram illustrating a voltage-controlled variable frequency oscillator of the second embodiment.

Accordingly, in the second embodiment, as described above, the control voltage /VCTL supplied from the differential amplifier 104 has the polarity opposite to the control voltage VCTL of the first embodiment. Because the opposite-polarity control voltage /VCTL is received, a voltage-controlled variable frequency oscillator 101 of FIG. 13 is used in the second embodiment instead of the voltage-controlled variable frequency oscillator 1.

The voltage-controlled variable frequency oscillator 101 differs from the voltage-controlled variable frequency oscillator 1 of FIG. 8 in the configuration of the delay circuit.

The delay circuit of the second embodiment includes a PMOS transistor 101_P3 that is the variable current element, and a source of the PMOS transistor 101_P3 is connected to the power supply line that is at the level of the supply voltage VDD. The delay circuit also includes an NMOS transistor 101_N1 and a PMOS transistor 101_P1. A source of the NMOS transistor 101_N1 is connected to the ground line that is at the level of the ground voltage VSS. A source of the PMOS transistor 101_P1 is connected to a drain of the PMOS transistor 101_P3. The output of the inverter 1_IV3 is fed into gates of the MOS transistors 101_N1 and 101_P1 through an inverter 101_IV1. Drains of the MOS transistors 101_N1 and 101_P1 of the delay circuit are connected to the input of the NAND gate 1_G1.

On the other hand, the counterpart of the delay circuit includes a PMOS transistor 101_P4 that is a variable current element, and a source of the PMOS transistor 101_P4 is connected to the power supply line that is at the level of the supply voltage VDD. The counter part also includes an NMOS transistor 101_N2 and a PMOS transistor 101_P2. A source of the NMOS transistor 101_N2 is connected to the ground line that is at the level of the ground voltage VSS. A source of the PMOS transistor 101_P2 is connected to a drain of a PMOS transistor 101_P4. The output of the inverter 1_IV4 is fed into gates of the MOS transistors 101_N2 and 101_P2 through an inverter 101_IV2. Drains of the MOS transistors 101_N2 and 101_P2 of the counterpart are connected to the input of the NAND gate 1_G2.

The control voltage /VCTL is supplied from the differential amplifier 104 to gates of the PMOS transistors 101_P3 and 101_P4 that are the two variable current elements.

Thanks to activities of the PMOS transistors 101_P3 and 101_P4, the frequency of the clock signal PCLK supplied from the circuit becomes lower when the control voltage /VCTL is raised, and the frequency of the clock signal PCLK becomes higher when the control voltage /VCTL is lowered.

At this point, thanks to the activity of the amplifying unit 104_3 of the differential amplifier 104, the control voltage /VCTL has amplitude of 0 V to the power supply voltage VDD. The control voltage /VCTL is almost entirely proportional to a potential difference between the voltages fed into the inputs PLUS and MINUS according to a scaling factor (104_RF+104_RP)/104_RP defined by the feedback circuit 104_4. Accordingly, the constant voltage boost power supply of the second embodiment exhibits a uniform boost characteristic with respect to the wide load current.

As described above, the constant voltage boost power supply that supplies the stable output voltage VPP even if the production process fluctuates or even if the load current fluctuates largely can be provided in the second embodiment.

Third Embodiment

Figure 14:
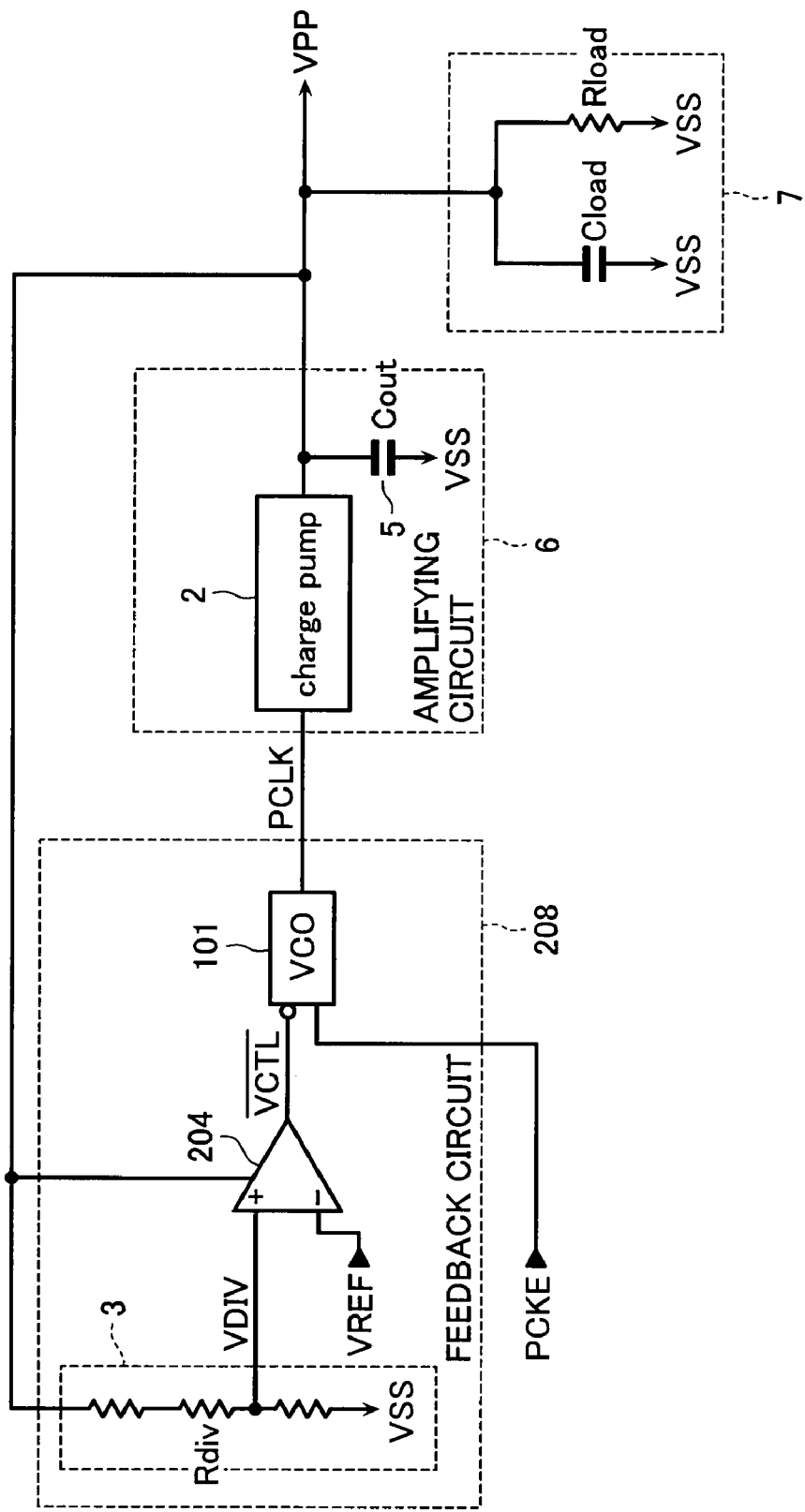
FIG. 14 is a block diagram illustrating a constant voltage boost power supply according to a third embodiment of the invention.

FIG. 14 is a block diagram illustrating a constant voltage boost power supply according to a third embodiment of the invention.

The constant voltage boost power supply of the third embodiment has the configuration simpler than that of the second embodiment and the stability of the output voltage VPP, which is higher than that of the first embodiment.

The configuration of the constant voltage boost power supply of the third embodiment differs from that of the second embodiment in that the voltage supplied to the differential amplifier becomes the output voltage VPP. Therefore, in the third embodiment, an open-loop differential amplifier 204 is used instead of the differential amplifier 104 of the second embodiment.

Advantageously the closed-loop differential amplifier 104 of the second embodiment is hardly influenced by the variation of the production process because the gain of the closed-loop differential amplifier 104 can be adjusted by a resistance ratio of the feedback circuit 104_4. However, the capacitor 104_C1 that is the phase compensating circuit is required to stabilize the feedback control system, and the high cutoff frequency is difficult to set. On the other hand, because the phase compensating circuit is not required in the open-loop differential amplifier 204 of the third embodiment, the high cutoff frequency is easy to set. Generally the open-loop differential amplifier has a disadvantage that the open-loop differential amplifier is strongly influenced by the variation of the MOS transistor constituting the circuit. However, the influence of the variation of the MOS transistor can be reduced by supplying the output voltage VPP.

Generally a characteristic of an analog circuit typified by the differential amplifier is easily influenced by a variation of an element constituting the analog circuit with decreasing the power supply voltage supplied to the analog circuit. However, contrarily the influence of the variation of the element can be reduced by supplying the higher voltage to the differential amplifier 204 using the phenomenon.

Figure 15:
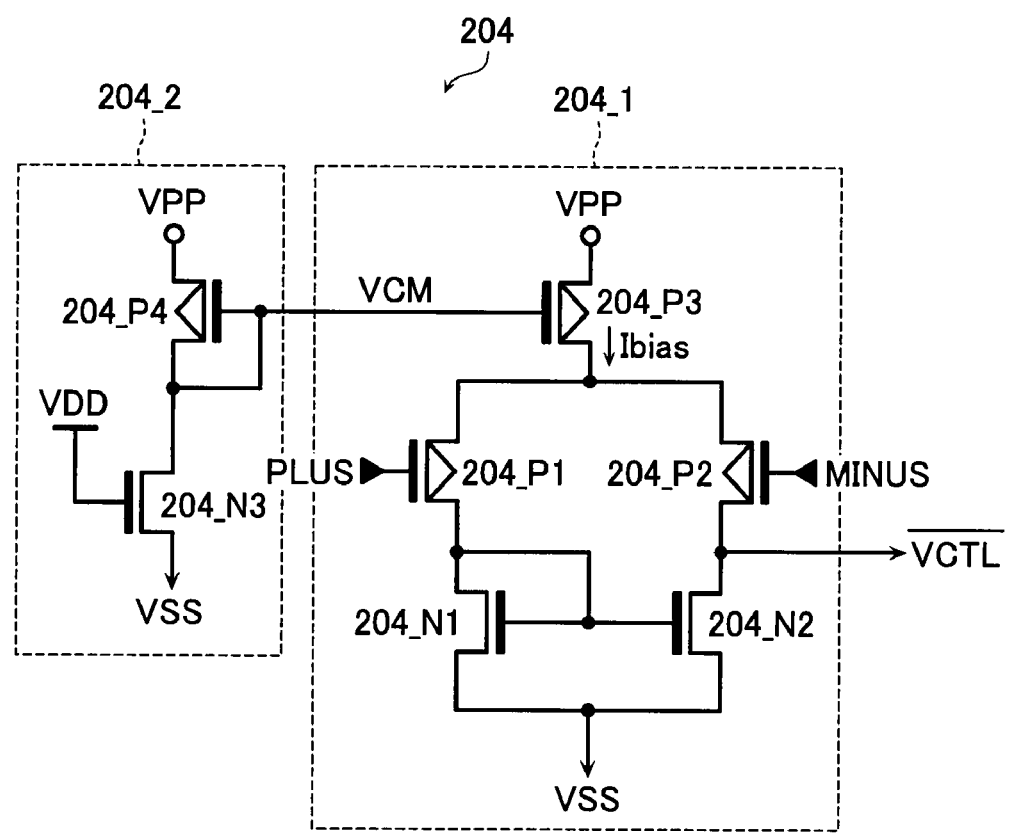
FIG. 15 is a circuit diagram illustrating a differential amplifier of the third embodiment.

FIG. 15 is a circuit diagram illustrating the differential amplifier 204 of the third embodiment.

The differential amplifier 204 includes a differential input unit 204_1 and a bias circuit 204_2 that controls the bias current Ibias passed through the differential input unit 204_1.

The differential input unit 204_1 includes a PMOS transistor 204_P3, and a source of the PMOS transistor 204_P3 is connected to the power supply line that is at the level of the output voltage VPP. The bias circuit 204_2 controls the PMOS transistor 204_P3 in order to pass the bias current Ibias through the differential input unit 204_1. The differential input unit 204_1 also includes a PMOS transistor 204_P1 and a PMOS transistor 204_P2. The PMOS transistor 204_P3 is connected to a source of the PMOS transistor 204_P1, and the noninverting input PLUS is connected to a gate of the PMOS transistor 204_P1. The PMOS transistor 204_P3 is connected to a source of the PMOS transistor 204_P2, and the inverting input MINUS is connected to a gate of the PMOS transistor 204_P2. The PMOS transistors 204_P1 and 204_P2 constitute a differential input pair, and the elements having the same shape are used as the PMOS transistors 204_P1 and 204_P2 in order to equalize the electrical characteristics to each other. The differential input unit 204_1 also includes a loading NMOS transistor 204_N1 and a loading NMOS transistor 204_N2. A source of the loading NMOS transistor 204_N1 is connected to the ground line that is at the level of the ground voltage VSS, and a drain of the loading NMOS transistor 204_N1 is connected to a drain of the PMOS transistor 204_P1. A source of the loading NMOS transistor 204_N2 is connected to the ground line that is at the level of the ground voltage VSS, and a drain of the loading NMOS transistor 204_N2 is connected to a drain of the PMOS transistor 204_P2. Gates of the NMOS transistors 204_N1 and 204_N2 are commonly connected to a drain of the PMOS transistor 204_P1. As with the PMOS transistors 204_P1 and 204_P2, the elements having the same shape are used as the NMOS transistors 204_N1 and 204_N2 in order to equalize the electrical characteristics to each other, and the NMOS transistors 204_N1 and 204_N2 act as current loads equivalent to each other. In the configuration of FIG. 15, a node point of the MOS transistors 204_P2 and 204_N2 becomes the control voltage /VCTL that is the output of the differential amplifier 204.

The bias circuit 204_2 includes an NMOS transistor 204_N3 and a PMOS transistor 204_P4. A source of the NMOS transistor 204_N3 is connected to the ground line that is at the level of the ground voltage VSS, and a gate of the NMOS transistor 204_N3 is connected to the power supply line that is at the level of the supply voltage VDD. A source of the PMOS transistor 204_P4 is connected to the power supply line that is at the level of the output voltage VPP, and a drain and a gate of the PMOS transistor 204_P4 are connected to a drain of the NMOS transistor 204_N3. The gate of the PMOS transistor 204_P4 is connected to the gate of the PMOS transistor 204_P3 of the differential input unit 204_1.

The NMOS transistor 204_N3 of the bias circuit $204_{\_2}$ is operated in a saturation region, the current passed through the two series-connected MOS transistors 204_N3 and 204_P4 is kept constant irrespective of the output voltage VPP when the output voltage VPP is higher than the supply voltage VDD. The current is influenced by electrical characteristics such as the output voltage VPP and the threshold voltage Vtn of the NMOS transistor 204_N3. However, when the output voltage VPP is sufficiently higher than the threshold voltage Vtn, the change in current is extremely small and negligible.

The PMOS transistor 204_P3 of the differential input unit 204_1 and the PMOS transistor 204_P4 of the bias circuit 204_2 constitute a current mirror circuit, and the bias current Ibias passed through the differential input unit 204_1 is controlled and kept constant by the bias circuit 204_2.

In the differential amplifier 204 having the configuration of FIG. 15, the control voltage /VCTL becomes an intermediate voltage when the reference voltage VREF given to the noninverting input PLUS is equal to the monitor voltage VDIV given to the inverting input MINUS. The control voltage /VCTL becomes higher when the reference voltage VREF is higher than the monitor voltage VDIV. On the other hand, the control voltage /VCTL becomes lower when the reference voltage VREF is lower than the monitor voltage VDIV. At this point, a ratio of change in the control voltage /VCTL to the potential difference between the reference voltage VREF fed into the noninverting input PLUS and the monitor voltage VDIV fed into the inverting input MINUS becomes the gain, and an inverse number of a reaction time of the control voltage /VCTL in changing the potential difference becomes the cutoff frequency. It is necessary that the gain and the cutoff frequency be optimized for the stable operation of the constant voltage boost power supply. In the case of the open-loop differential amplifier such as the differential amplifier 204, the gain and the cutoff frequency can be set at desired values by adjusting the channel length and channel width of the MOS transistor constituting the circuit.

However, in the differential amplifier having the simple configuration of FIG. 15, when the voltages given to the inputs PLUS and MINUS are close to 0 V or the output voltage VPP, disadvantageously the gain and the cutoff frequency of the differential amplifier cannot be set to the desired values although the channel length and channel width of the MOS transistor constituting the circuit are optimized. That is, in order to obtain the desired electrical characteristics, it is necessary that both the voltages fed from the inputs PLUS and MINUS fall within a narrow range. Assuming that Vtn is the threshold voltage of the NMOS transistor and Vtp is the threshold voltage of the PMOS transistor, the voltages fed from the inputs PLUS and MINUS range from Vtn to (VPP−2×Vtp) as a target for the stable operation.

In the third embodiment, the output voltage VPP is supplied to the differential amplifier 204 in order to satisfy the stable operation condition. At this point, a voltage dividing ratio of the voltage dividing circuit 3 is set to 1/2.5, and the supply voltage VDD is supplied as the reference voltage VREF. It is assumed that the output voltage VPP is set 2.5 times the supply voltage VDD. In such cases, the supply voltage VDD is fed into the noninverting input PLUS of the differential amplifier 204, and the voltage about 1/2.5 times the output voltage VPP is fed into the inverting input MINUS, so that the voltages fed into the inputs PLUS and MINUS can fall within about VPP−(2×Vtp).

In the simple differential amplifier having no component corresponding to the amplifying unit 104_3 of the differential amplifier 104 of FIG. 12, the control voltage /VCTL of the simple differential amplifier has an upper limit of the voltage level that is lower than the output voltage VPP by the threshold voltage Vtp of the PMOS transistor. In the state close to the operating limit, the gain and cutoff frequency of the differential amplifier cannot be set at the desired values. Therefore, unfortunately sometimes the output voltage VPP becomes higher than the desired voltage when the load current Iload is small, and sometimes the differential amplifier goes into the oscillating state when the load current Iload is large. In the third embodiment, the problem is solved by supplying the output voltage VPP to the differential amplifier 204. As described above, the control voltage /VCTL that is the output of the differential amplifier 204 is limited to the output range of 0 to (VPP−Vtp). However, the control voltage /VCTL that is the output of the differential amplifier 204 is wider than the control voltage /VCTL of 0 to VDD of the voltage-controlled variable frequency oscillator 101. Accordingly, the voltage-controlled variable frequency oscillator 101 can be used like the second embodiment. The problem of the narrowed permissible range of the load current Iload can be solved in the above-described way.

The constant voltage boost power supply, in which the variation of the production process has little influence because of the simple circuit configuration and the permissible range of the load current is widened, can be provided in the third embodiment.

What is claimed is:

1. A constant voltage boost power supply comprising:
a voltage-controlled variable frequency oscillator that produces and supplies a clock signal, and changes an oscillating frequency of the supplied clock signal according to a control voltage;
a charge pump into which the clock signal is fed, the charge pump performing a pumping operation in synchronization with the clock signal to boost an input voltage and supply an output voltage in which the input voltage is boosted;
a voltage dividing circuit that divides the output voltage of the charge pump to supply a monitor voltage; and
a differential amplifier into which the monitor voltage and a reference voltage are fed, the differential amplifier amplifying a potential difference between the monitor voltage and the reference voltage to supply the control voltage,
wherein the voltage-controlled variable frequency oscillator includes:
a flip-flop that produces and supplies the clock signal;
a delay circuit that delays the clock signal, fed back from the flip-flop, according to the control signal; and
an oscillation control unit that controls a start and a stop of oscillation of the flip-flop based on a signal supplied from the delay circuit and an oscillation enable signal for permitting the oscillation of the clock signal.

2. The constant voltage boost power supply according to claim 1, wherein the differential amplifier receives the monitor voltage at an inverting input, and receives the reference voltage at a noninverting input.

3. The constant voltage boost power supply according to claim 1, wherein the differential amplifier receives the reference voltage at an inverting input, and receives the monitor voltage at a noninverting input.

4. The constant voltage boost power supply according to claim 1, wherein the charge pump includes:
a plurality of unidirectional rectifying elements that are connected in series between a terminal into which the input voltage is fed and a terminal from which the output voltage is supplied; and
a plurality of decoupling capacitors each including one terminal connected to a respective connection point of the rectifying elements.

5. The constant voltage boost power supply according to claim 4, wherein each of the rectifying elements of the charge pump is a diode.

6. The constant voltage boost power supply according to claim 4, wherein each of the rectifying elements of the charge pump is a transistor in which a source and a gate are commonly connected.

7. The constant voltage boost power supply according to claim 2, wherein the differential amplifier includes:
a differential input unit that receives the voltages at the noninverting input and inverting input, and amplifies a difference between the voltages to produce and supply the control voltage; and
a bias circuit that controls a bias current passed through the differential input unit.

* * * * *